Oct. 1, 1935.        F. MARTI        2,015,905
SHOCKPROOF BEARING, PARTICULARLY FOR CLOCK MECHANISMS
Filed Feb. 14, 1934
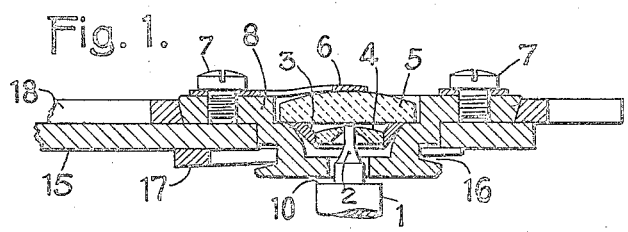
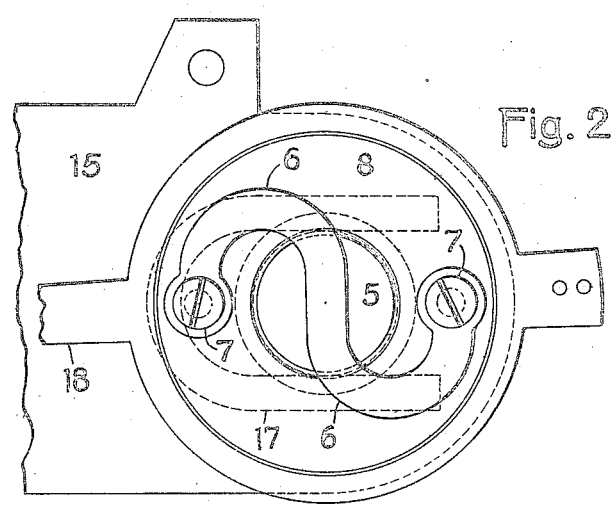
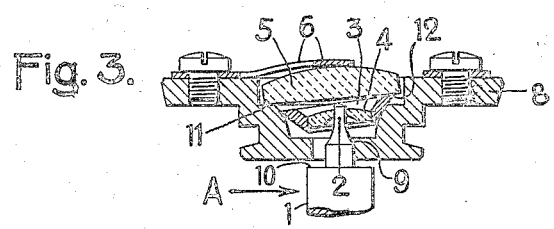
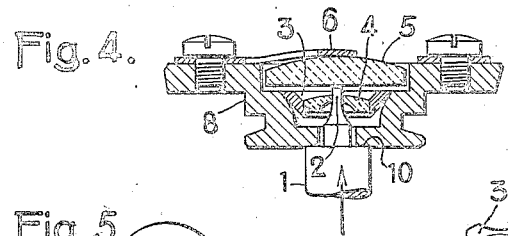
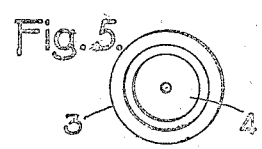
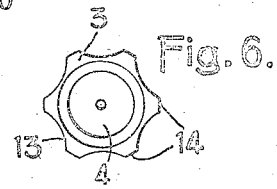

Patented Oct. 1, 1935

2,015,905

UNITED STATES PATENT OFFICE 2,015,905

SHOCKPROOF BEARING, PARTICULARLY FOR CLOCK MECHANISMS

Fritz Marti, La Chaux-de-Fonds, Switzerland

Application February 14, 1934, Serial No. 711,238
In Switzerland March 2, 1933

10 Claims. (Cl. 58—140)

This invention relates to bearings, and is suitable particularly but not exclusively for the shafts of clock mechanisms.

The principal feature of the invention consists in that the bearing member which receives the pin of the shaft is conical and is suspended in a corresponding recess in a bearing body and is maintained therein by a cover jewel having a retaining member.

If desired the aforesaid retaining member may consist of a leaf spring, which retains the bearing member in the bearing body so as to permit it to tilt, so that when the shaft is subjected to axial thrusts it tilts and raises one side of the cover jewel against the pressure of the spring, being returned to its central position by the spring upon cessation of the thrust. The bearing is in this way rendered sufficiently elastic to protect delicate pivot pins from damage due to shocks or falls. Such a bearing has in addition the advantage of extremely simple construction and small requirement of space, so that it can be applied to even the smallest wrist watches.

The accompanying drawing illustrates a constructional example of the invention.

Figure 1 is a section through a bearing constructed in accordance with the invention.

Figure 2 is a plan view thereof.

Figure 3 is a sectional view similar to Figure 1, but showing the positions assumed when the shaft is subjected to a radial thrust.

Figure 4 is a view similar to Figure 3, but showing the positions assumed when the shaft is subjected to an axial thrust.

Figures 5 and 6 are plan views of bearing members or jewels.

A bearing body 8 (Figures 1 and 2) having a central aperture, is suitably recessed for the reception of a conical bearing member 3, carrying a cylindrical bearing jewel 4, and an end bearing member 5, in the form of a circular jewel, constituting the cover jewel.

The conical bearing member 3 and the end bearing member 5 are loosely inserted in the bearing body 8 and are maintained therein by the pressure of a steel spring 6.

The recess in the bearing body 8 for the conical bearing member 3 corresponds exactly to the diameter of the bearing, so that the bearing member 3 when inserted comes to rest so that its wider end just meets the lower surface of the cover jewel 5. Thus by the application of the cover jewel 5 the bearing member 3 is enclosed without play in the bearing body 8. The recess in the bearing body is extended downwardly so that the conical bearing member 3 is suspended in the recess and can tilt therein to a certain extent.

In the normal condition of the pivot pin 2 the parts of the bearing remain stationary. Only upon extreme loading does movement of the parts of the bearing take place. When the shaft receives a radial thrust, for example in the direction of the arrow A, Figure 3, the conical bearing member 3 tilts partly out of its seat, rising at 12, and pushes the counter bearing member 5 upwards, so that the latter also tilts about the point 11 and raises the spring 6. The swinging out of the shaft or pivot 1 is limited by its striking on the wall of the central aperture in the bearing body 8 at the point 9. The thrust is transmitted from the shaft directly on to the fixed bearing body 8 at the point of contact 9, so that the pivot pin 3 is relieved and therefore remains undamaged. After the thrust the spring 6 presses the cover jewel 5 and in turn the bearing member 3 back into their normal positions. It will be clear that the device operates in the same manner in all radial directions.

Upon an axial thrust in the direction of the arrow B (Figure 4) the cover jewel or end bearing member 5 is alone forced upwards and raises the spring 6. The axial movement is limited by a shoulder 10 on the shaft 1, which strikes the bearing body 8 and transmits the thrust thereto.

The spring 6 is secured by means of two screws 7 to the bearing body 8. It can however be connected by other securing arrangements to the bearing body. It has the curved shape shown in Figure 2.

The bearing body 8 is for its part inserted in the framework of the clock and secured for example by screws. A particular method of securing is shown in Figures 1 and 2 and is used preferably for the application of the bearing to a balance-bridge, where the provision of securing screws is often not possible on account of lack of space. The balance-bridge 15 is indicated in section. The bearing body 8 is inserted in the bridge 15 and has an annular groove 16, into which a wedge-shaped bolt 17 is inserted. In this manner rigid connection is obtained.

The bearing body 8 can, in the case as illustrated of the bearing of a balance shaft, form a carrier for the regulator 18 for the hair-spring.

The conical bearing member can be formed entirely from a suitable stone. In the drawing it is shown as consisting of a conical ring 3 with an inserted cylindrical stone or jewel 4, see also Figure 5. Figure 6 shows a conical bearing member similar to this, in which in addition notches 13 are formed at the periphery of the ring 3, so that only small portions 14 of the periphery come into contact with the seat in the bearing body 8. In this manner space is provided for possible dust, which can be pushed into these notches. The lateral movement of the bearing member is also facilitated in this manner.

What I claim is:

1. A shock-proof bearing for shafts, particularly in clockworks, comprising a stationary bearing body, a movable bearing member having a conical outer shape and being suspended in a corresponding recess in said bearing body, a cover jewel to maintain said bearing member down in the recess of said bearing body and an elastic pressure member acting upon said cover jewel so as to allow lateral swivelling of said bearing member upon radial thrusts on the shaft against the pressure of said pressure member, said bearing member being provided with notches on its periphery.

2. A shock-proof bearing for shafts, comprising a bearing body, having a flat-shouldered recess therein, a somewhat conical bearing member rockingly and removably received in said recess, a pivot pin extending into said recess and into said bearing member, a counter-bearing loosely overlying said bearing member and the flat shoulder of said recess, and a resilient member separate from and yieldingly urging said counter-bearing axially into contact with said shoulder and said bearing member.

3. A shock-proof bearing for shafts, comprising a bearing body, having a flat-shouldered recess therein, a somewhat conical bearing member rockingly and removably received in said recess, a pivot pin extending into said recess and into said bearing member, a counter-bearing loosely overlying said bearing member and the flat shoulder of said recess, and a resilient member yieldingly urging said counter-bearing into contact with said shoulder and said bearing member, said resilient member being fastened to said bearing member in such manner as to exert axially-directed pressure on said counter-bearing.

4. A shock-proof bearing for shafts, comprising a bearing body, having a flat-shouldered recess therein, a somewhat conical bearing member rockingly and removably received in said recess and having its outer peripheral edge substantially flush with the flat shoulder of the recess, a pivot pin extending into said recess and into said bearing member, a counter-bearing loosely overlying said bearing member and the flat shoulder of said recess, and a resilient member yieldingly urging said counter-bearing into contact with said shoulder and said bearing member.

5. A shock-proof bearing for shafts, comprising a bearing body, having a flat-shouldered recess therein, a somewhat conical bearing member rockingly and removably received in said recess and having its outer peripheral edge substantially flush with the flat shoulder of the recess, a pivot pin extending into said recess and into said bearing member, a counter-bearing loosely overlying said bearing member and the flat shoulder of said recess, and normally bearing by a single surface on both the bearing member and the said flat shoulder, and a resilient member yieldingly urging said counter-bearing into contact with said shoulder and said bearing member.

6. A shock-proof bearing for shafts, comprising a bearing body, having a flat shouldered recess therein, a somewhat conical bearing member rockingly and removably received in said recess, a shaft having a pivot pin which extends into said recess and into said bearing member, a shoulder on said shaft normally disposed slightly out of contact with the underside of said bearing body, a counter-bearing loosely overlying said bearing member and the flat shoulder of said recess, and a resilient member separate from and yieldingly urging said counter-bearing axially into contact with said shoulder and said bearing member, axial thrusts on said shaft moving said pivot pin, bearing member and counter-bearing against the tension of said resilient member, the amount of movement being limited by contact of the shoulder on the shaft with the underside of the bearing body.

7. A shock-proof bearing for shafts, consisting of means for permitting limited momentary departure of the shafts from their customary positions upon occurrence of shocks, to dissipate the latter, the said means comprising a bearing body, having a flat-shouldered recess therein, a somewhat conical bearing member rockingly and removably received in said recess, a pivot pin extending into said recess and into said bearing member, a counter-bearing loosely overlying said bearing member and the flat shoulder of said recess, and a resilient member yieldingly urging said counter-bearing into contact with said shoulder and said bearing member.

8. In a watch mechanism, a shock-proof bearing assembly for watch shafts, comprising a balance-bridge, a bearing body held in said bridge, the said body having a flat-shouldered recess therein, a somewhat conical bearing member rockingly and removably received in said recess, a pivot pin extending into said recess and into said bearing member, a counter-bearing loosely overlying said bearing member and the flat shoulder of said recess, and a resilient member yieldingly urging said counter-bearing into contact with said shoulder and said bearing member.

9. In a watch mechanism, a shock-proof bearing assembly for watch shafts, comprising a balance-bridge, a bearing body having a grooved throat at one extremity thereof, the said body being received in a recess of said balance-bridge, with the grooved throat extending therethrough, a wedge inserted between said bridge and said throat, and wedgingly engaging said groove, to lock the bearing body on said bridge, the said body having a flat-shouldered recess therein, a somewhat conical bearing member rockingly and removably received in said recess, a pivot pin extending into said recess and into said bearing member, a counter-bearing loosely overlying said bearing member and the flat shoulder of said recess, and a resilient member yieldingly urging said counter-bearing into contact with said shoulder and said bearing member.

10. In a watch mechanism, a shock-proof bearing assembly for watch shafts, comprising a balance-bridge, a bearing body held in said bridge, the said body having a flat-shouldered recess therein, a somewhat conical bearing member rockingly and removably received in said recess, a pivot pin extending into said recess and into said bearing member, a counter-bearing loosely overlying said bearing member and the flat shoulder of said recess, a resilient member yieldingly urging said counter-bearing into contact with said shoulder and said bearing member, a rod, a hair-spring regulator engaging annularly about one end of the bearing body, the contacting surfaces of the bearing body and the regulator being interlocking, so that the regulator cannot be removed until the bearing body is removed from the bridge, the regulator resting frictionally against the bridge.

FRITZ MARTI.